John L. Otis.
Improvement in Belt-Shippers.
No. 110674
PATENTED JAN 3 1871
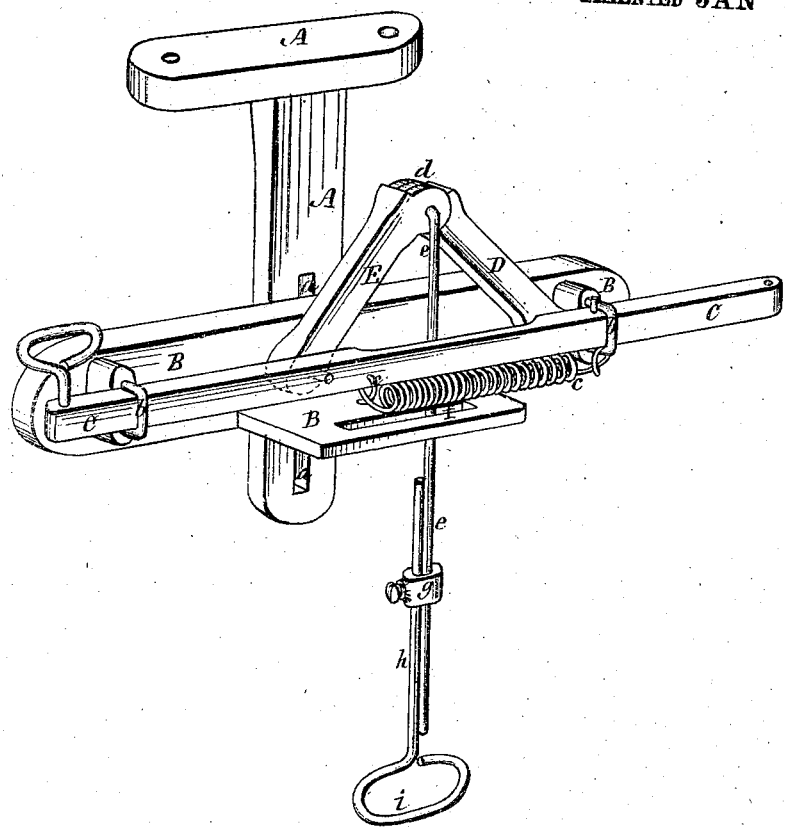
Witnesses
W. G. Henderson
Edmund Masson
Inventor
John L. Otis.
By atty A. B. Stoughton.

United States Patent Office.

JOHN L. OTIS, OF LEEDS, MASSACHUSETTS.

Letters Patent No. 110,674, dated January 3, 1871.

IMPROVEMENT IN BELT-SHIPPERS.

The Schedule referred to in these Letters Patent and making part of the same.

*To all whom it may concern:*

Be it known that I, JOHN L. OTIS, of Leeds, in the county of Hampshire and State of Massachusetts, have invented certain new and useful Improvements in Belt-Shippers; and I do hereby declare the following to be a full, clear, and exact description of the same, reference being had to the accompanying drawing making a part of this specification, in which is represented a perspective view of the shipper as attached to a hanger.

My invention consists—

In the use of toggle or knuckle-joint levers, in connection with a slide and spring for moving and holding a driving-belt.

It further consists in the combination of the toggle-levers, slide, and spring, with a double or adjustable hand-rod, for operating the shipper, as will be explained.

To enable those skilled in the art to make and use my invention, I will proceed to describe the same, with reference to the drawing, first premising that the shipper may be connected with any ordinary shaft-hanger, or may be attached to a separate hanger, as may be preferred.

A represents a hanger, to which the bar or frame B may be connected by set-screws passing through a slot, $a$, therein, by which it may be adjusted.

In guides $b$, of any suitable kind on the bar or frame B, a shipper-bar, C, is arranged, so as to be moved thereon and therein.

This shipper-bar C may have upon any of its sides the usual loop or pins, for controlling a belt that passes through or between them.

To the shipper-bar C there is attached one end of a coiled spring, $c$, the other end thereof being connected to the guide $b$, or any part of the bar, frame, or other stationary point, so that the spring, in its normal condition, will hold the shipper-bar in the position shown in the drawing.

D E are toggle or knuckle-joint levers, united at $d$ by a rule-joint.

The lower end of the lever D is pivoted to the bar or frame B, and the lower end of the lever E is pivoted to the shipper-bar C.

At the joint $d$, or near thereto, is fastened a rod, $e$, which extends downward through a guiding slot, $f$, in the bar or frame B, and its lower portion passes through a coupling-piece, $g$, through or into which another rod, $h$, passes and laps by, so that the two rods may be lengthened or shortened, or swung into convenient position by the operator, who, by the handle $i$, may ship the belt.

When the toggle-levers are drawn down into a horizontal position, which moves the shipper-bar and belt, the spring $c$ is expanded, and the parts will remain in that position and hold the belt firmly to its pulley. When the belt is to be shifted onto the other or loose pulley, a slight upward movement of the rod will raise the toggles from their horizontal position, and the contraction of the spring $c$ completes the movement.

Having thus fully described my invention,

What I claim therein as new, and desire to secure by Letters Patent, is—

1. In combination with the hanger, the frame or support, the shipper-bar, the toggle levers, and spring, substantially as and for the purpose described.

2. In combination, the support or frame, the shipper-bar, toggle-levers, and spring, the adjustable rods, for bringing the handle within convenient position for the operator, substantially as described.

JOHN L. OTIS.

Witnesses:
S. B. FULLER.
P. A. OTIS.